(12) United States Patent
Gorgone (10) Patent No.: US 7,161,097 B1
(45) Date of Patent: Jan. 9, 2007

(54) CONTAINER WITH A BUILT-IN SCALE

(76) Inventor: Carmelo Gorgone, 5108 Seventh Ave., Brooklyn, NY (US) 11220

( * ) Notice: Subject to any disclaimer, the term of this patent is extended or adjusted under 35 U.S.C. 154(b) by 0 days.

(21) Appl. No.: 11/253,243

(22) Filed: Oct. 17, 2005

(51) Int. Cl.
*G01G 19/52* (2006.01)

(52) U.S. Cl. ............... 177/126; 177/131; 177/245; 190/115; 206/278

(58) Field of Classification Search ........... 190/115; 206/278; 177/126, 131, 148–149, 211, 245
See application file for complete search history.

(56) References Cited

U.S. PATENT DOCUMENTS

| | | | | |
|---|---|---|---|---|
| 2,069,499 | A | * | 2/1937 | Marin et al. ............... 177/238 |
| 2,518,973 | A | * | 8/1950 | Atherton ..................... 190/102 |
| 2,710,083 | A | * | 6/1955 | White ......................... 190/102 |
| 2,759,577 | A | * | 8/1956 | White ......................... 190/102 |
| 2,937,016 | A | * | 5/1960 | Westman ..................... 177/156 |
| 3,321,036 | A | * | 5/1967 | Keenan et al. .............. 177/245 |
| 3,460,642 | A | | 8/1969 | Provi et al. |
| 3,478,618 | A | | 11/1969 | Provi et al. |
| 3,666,031 | A | | 5/1972 | Provi et al. ................. 177/186 |
| 4,572,309 | A | | 2/1986 | Nishiyama .................... 177/50 |
| 4,893,685 | A | | 1/1990 | Bergman et al. ............. 177/174 |
| 5,641,947 | A | * | 6/1997 | Riddle, Jr. ................... 177/126 |
| 5,886,302 | A | | 3/1999 | Germanton et al. ........ 177/199 |
| 6,043,438 | A | | 3/2000 | Helberg ....................... 177/148 |
| 6,410,863 | B1 | | 6/2002 | Cappiello ................. 177/25.13 |
| 6,608,261 | B1 | | 8/2003 | Thadani ....................... 177/126 |
| 6,781,067 | B1 | | 8/2004 | Montagnino et al. .... 177/25.13 |
| 2003/0196837 | A1 | * | 10/2003 | Ballard |
| 2005/0217903 | A1 | * | 10/2005 | Roberts et al. |
| 2006/0054364 | A1 | * | 3/2006 | Kamakau |
| 2006/0131082 | A1 | * | 6/2006 | Shai |

* cited by examiner

*Primary Examiner*—Randy W. Gibson (57) ABSTRACT

This invention provides a simple means for a user to determine the weight of a container with its contents before lifting or transporting it, therefore increasing safety for the user, as back strain and other physical discomforts can result from the repetitive lifting and prolonged carrying of containers that are too heavy. Furthermore, the claimed invention is a container with a built-in scale that allows a traveler on a commercial airline, train, bus or watercraft, to determine the weight of container with its contents so that the traveler can compare the weight of the of the container to baggage weight restrictions prior to departure, therefore, saving the traveler time and money.

7 Claims, 5 Drawing Sheets

CONTAINER WITH A BUILT-IN SCALE

FIELD OF THE INVENTION

The claimed invention relates to containers, including, but not limited to, storage bins, luggage, suitcases, backpacks, totes, attaches, tubs, baggage, valises, coolers, chests, boxes, crates, trunks, lockers, drums, barrels, duffle bags and briefcases. Specifically, the claimed invention relates to containers that have a built-in scale that determines the weight of the articles placed into the container.

BACKGROUND OF THE INVENTION

People or travelers who inhabit the world are constantly traveling from city to city, state to state and country to country. Usually, the people that are traveling utilize baggage to hold their clothes, business files and other personal belongings. Many travelers have problems with their baggage exceeding the weight limit imposed on them by commercial carriers as they check their baggage or containers with the carriers. In these instances, the travelers were not aware that their baggage exceeded the weight limitations until after arriving at the commercial carrier terminal. As a result, the travelers either had to pay additional weight fees or discard some personal articles from their baggage.

In addition, filled containers may present a potential danger when it is being lifted, stored, or transported. The user will be protected from the aforementioned potential danger if he knows the weight of the filled container prior to attempting to lift it. Also, when the user knows the weight of the containers prior to storage and stacking items on top of the container it will prevent the user from possibly crushing items in the container.

In view of the above-mentioned problems, there is a need for a container with a built-in scale that indicates the weight of the content of the container, which enables a user to easily comply with baggage weight limits and protects items from being damaged in the container.

SUMMARY OF THE INVENTION

An object of the present invention is to provide a container that enables a user to simply determine the weight of articles placed in the container, and determine the weight of the container before the user weighs the container at a desk of a commercial air carrier.

In a preferred embodiment of the invention, a container with a built-in scale is disclosed. The container includes a base, where the base comprises a planar bottom having a plurality of side walls. The planar bottom and the plurality of side walls are configured to form an interior compartment in the base. A scale is mounted on the planar bottom, where the scale is configured to determine a measured weight. The scale is configured to communicate the determined measured weight from the scale to a display mounted on the base. The display is configured to display the measured weight.

In another preferred embodiment of the invention, another container with a built in scale is disclosed. The container includes a bottom portion, wherein the bottom portion comprises a planar bottom base and a plurality of bottom side walls. The planar bottom base and the plurality of bottom side walls form a bottom interior compartment. A top portion is connected to the bottom portion, wherein the top portion comprises a planar top base and a plurality of top side walls, wherein the planar top base and the plurality of top side walls from a top interior compartment. A bottom scale mounted on said planar bottom base, wherein the bottom scale is configured to determine a first measured weight. A top scale is mounted on the planar top base, wherein the top scale is configured to determine a second measure weight. The top scale is configured to communicate the determined second measured weight from the top scale to a top portion display mounted on the top portion. The bottom scale is configured to communicate the determined first measured weight from the bottom scale to a bottom portion display mounted on the bottom portion. The top portion display is configured to display the determined second measured weight from the top portion. The bottom portion display is configured to display the determined first measured weight from the bottom portion.

In another preferred embodiment of the invention, another container with a built in scale is disclosed. A base that comprises a planar bottom and a plurality of side walls, where the planar bottom and the plurality of side walls from an interior compartment. A flexible connector is connected to the base, wherein the flexible connector includes a first end and a second end; a scale connected to the first end of the flexible connector and the second end of the flexible connector is connected to the base, where in the scale is configured to determine a measured weight. The scale is configured to communicate the determined measured weight from the scale to a display, where the display is mounted on said base. The display is configured to display the determined measured weight.

BRIEF DESCRIPTION OF SEVERAL VIEWS OF THE DRAWINGS

These and other advantages of the present invention will become more apparent as the following description is read in conjunction with the accompanying drawings, wherein.

DETAILED DESCRIPTION OF THE INVENTION

In the following description, various aspects of the present invention will be described. For purposes of explanation, specific configurations and details are set forth to provide a thorough understanding of the present invention. However, it will also be apparent to one skilled in the art that the present invention may be practiced without the specific details. Furthermore, well-known features may be omitted or simplified to not obscure the present invention. In addition, to the extent that orientations of the invention are described, such as "top," "bottom," "front," "side," and the like, these orientation terms are to aid in understanding the invention, and are not meant to be limiting.

Figure 1:
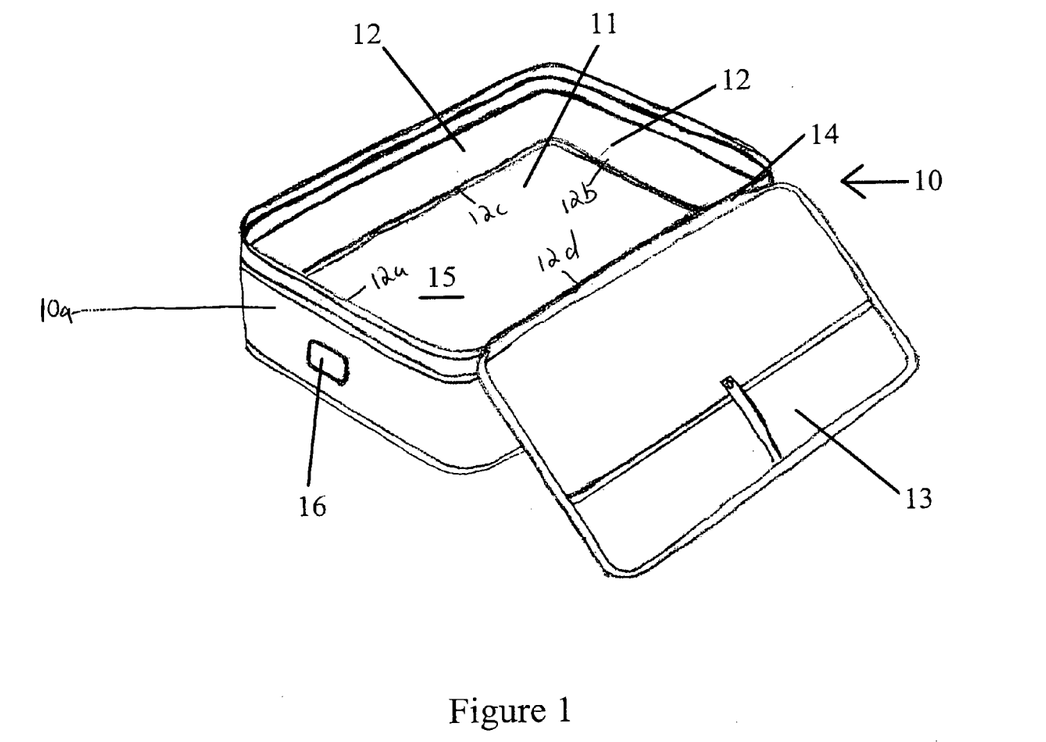
FIG. 1 is a perspective view of a container according to an embodiment of the invention, where the container is an open suitcase with a lid.

FIG. 1 illustrates an embodiment of the invention, which is a suitcase 10. Suitcase 10 has a base 10a, which has a planar bottom 11 attached to a plurality of side walls 12 forming an interior compartment. The plurality of side walls 12 includes: a left side wall 12a, right side wall 12b, front sidewall 12c and a back side wall 12d. The suitcase 10 also has a lid 13 that alternates between an open (shown) position and a closed (not shown) position. The container may be a storage bin, luggage, suitcase backpack, tote, attaché tub, briefcase, baggage, valise, cooler chest box, crate, trunk, locker, drain barrel and duffle bag. The lid 13 is fixedly attached to the back side wall 12d along a common edge 14 by hinges, stitching or any other manner known in the art. When the suitcase 10 is in the closed position, the lid 13 may be secured to the side walls 12 by latches, zippers or any other manner known in the art (not shown).

A scale 15 for measuring the weight of a plurality of articles is mounted on the base 10a or the planar bottom 11 of suitcase 10. The scale 15 can be any conventional weighing mechanism sized to accommodate or cover the entire area of the planar bottom 11. Scale 15 is designed to measure the weight in any standard units of measurement, such as pounds or kilograms. The present invention may utilize prior art weight scales that utilize rotating number dials and pointers associated with fixed indicia for displaying weight data to a user, such as scales disclosed in U.S. Pat. No. 4,893,685, U.S. Pat. No. 3,666,031, U.S. Pat. No. 3,478,618 and U.S. Pat. No. 3,460,642, all of which are incorporated by reference. These prior art scales utilize mechanical sensing mechanisms, levers, springs and multiple moving parts as part of their design. The present invention may also utilize scales that are in widespread use today, which typically utilize electronic means to provide a digital readout of the associated weight.

The present invention may also utilize other scales that employ sensing devices such as transducer load cell assemblies or piezoelectric sensors for measuring the weight, an analog to digital converter for converting the sensed signal into digital format, and a microcomputer for receiving the Analog to Digital (A/D) converted data and displaying the digital representation onto a digital display, such as a Liquid Crystal Display (LCD), an example of such device is provided in U.S. Pat. No. 4,572,309, U.S. Pat. No. 5,886,302, both of which are hereby incorporated by reference.

The present invention may also utilize a sensor device which provides weight signal data to a digital processor for driving an electro mechanical actuator to produce an analog readout of the weight. An example of such device is provided in U.S. Pat. No. 6,410,863, which is hereby incorporated by reference. Scale 15 is preferably, but not limited to, an electronic or digital scale. The features of the present invention may be used in many scale configurations having several different types of weighing mechanisms, including but not limited to, mechanical weighing mechanisms, pulse count weighing mechanisms, and electronic weighing mechanisms. In accordance with one embodiment of the present invention, the weighing mechanism generates information about the measured weight of the articles, weight of the scale, weight of the container and any combination thereof and that information is digital or may be converted to digital. In this manner, the weight information may be communicated to a remote display 16.

Like most scales known in the art, the scale 15 has a surface for receiving articles to determine the weight of the articles. The surface of the scale 15 covers the entire area of the planar bottom 11. When articles are placed on the scale 15, the measured weight is communicated to the display 16, which is mounted on the suitcase 10. The display 16 is preferably, but is not limited to, a digital display such as, for example, a liquid crystal display (LCD), a light emitting diode (LED) display, or other display devices. For the present invention, the scale 15 communicates with the display 16 by utilizing a wireless connection. For example, present invention may utilize the wireless technology described in U.S. Pat. No. 6,781,067, which is hereby incorporated by reference. Wireless means for communicating the measured weight from the scale 15 to the display 16 includes, but is not limited to, radio frequency (RF) and infrared (IR) signals. Alternatively, the means for communicating the measured weight from the scale 15 to the display 16 may be hard-wired, in other words, electronically connected. A printed circuit board or similar device may be needed at both the scale 15 and the display 16. Most advantageous is the wireless RF means for communicating the measured weight because a line of sight connection between the scale and the display is not needed. In embodiments of the present invention, where the means for communication the measured weight is wireless, the display 16 is not limited to being mounted on the container.

The display 16 may indicate the measured weight of the articles that are placed on the scale 15. Alternatively, the display 16 may indicate the sum of the measured weight of the articles that are placed on the scale 15 and of the weight of the suitcase 10, as the weight of the suitcase 10 may be predetermined and preprogrammed into the scale 15 by the manufacturer or the user. In another embodiment, the display 16 may simultaneously indicate both the weight of the articles that are placed on the scale 15 and the weight of the sum of the weight of the articles that are placed on the scale 15 and of the weight of the suitcase 10. In yet another embodiment of the invention, display 16 indicates the weight of articles place on the scale, the weight of the suitcase 10 and the weight of the scale 15.

Figure 2:
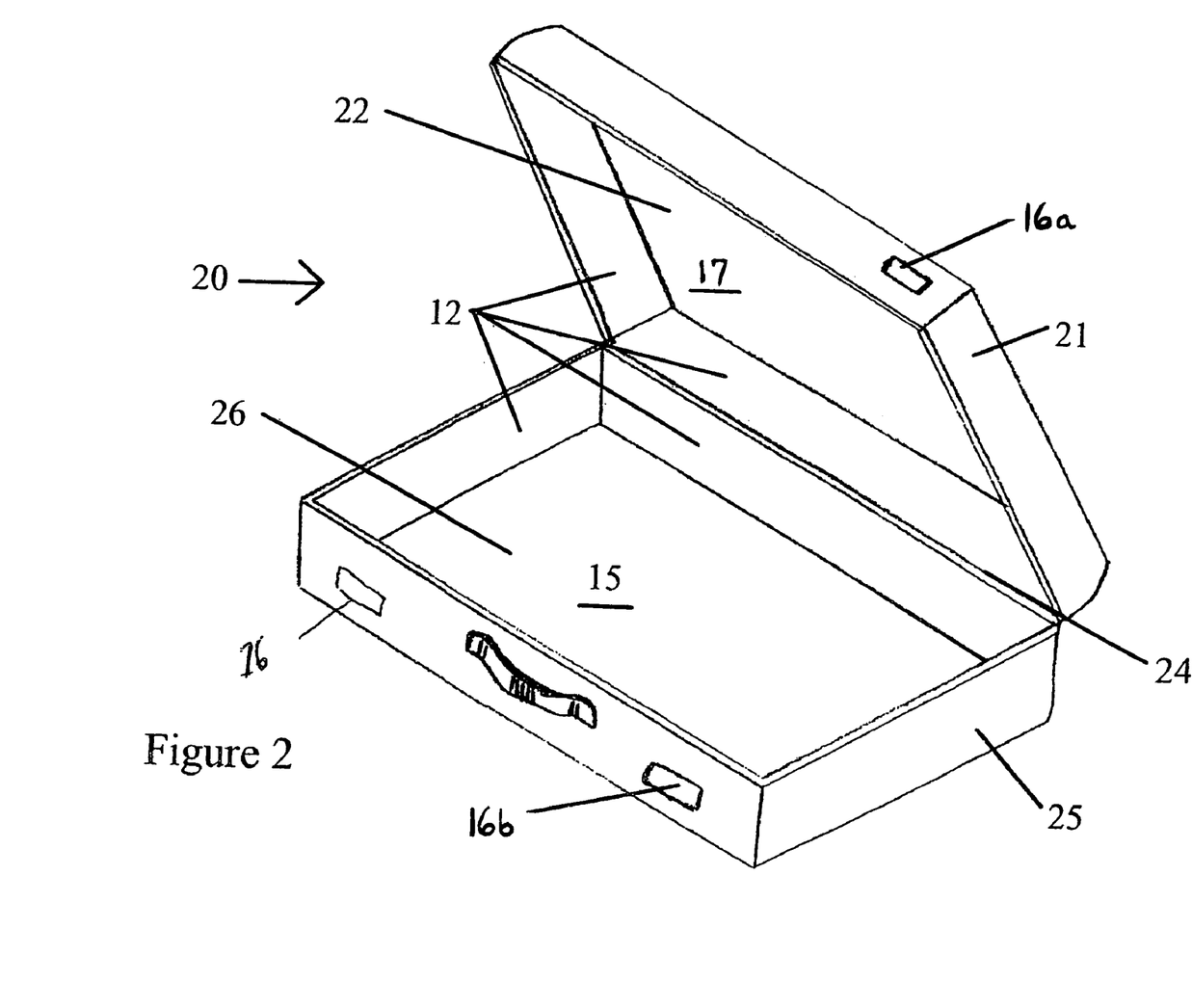
FIG. 2 illustrates a container according to an embodiment of the invention, where the container is an open suitcase that has two portions.

FIG. 2 shows another embodiment of the present invention, wherein the container is a two-portion suitcase 20 having a top portion 21 and a bottom portion 25. The top portion 21 and bottom portion 25 has a plurality of side walls 12, forming a top interior compartment and bottom interior compartment, respectively. The two-portion suitcase 20 alternates between an open (shown) position and a closed (not shown) position. The top portion 21 is fixedly attached to the bottom portion 25 along a common edge 24 by hinges, stitching or any other manner known in the art. When the suitcase 20 is in the closed position, the top portion 21 may be secured to the bottom portion 25 by latches, zippers or any other known manner in the art (not shown). The top portion 21 has a planar top wall 22 and the bottom portion 25 has a planar bottom base 26.

A scale 17 for determining a second measured weight of a plurality of articles is mounted on the planar top wall 22 and the scale 15 for determining a first measured weight of a plurality of articles mounted on the planar bottom base 26. Scale 17 is equivalent to scale 15, described above, so a description of scale 17 is not disclosed herein. Like most scales known in the art, each scale 15 and 17 have a surface for receiving articles to determine the first and second measured weight of the articles. The scale surfaces of each of the scales 17 and 15 cover the entire area of each of the planar top wall 22 and the planar bottom base 26, respectively.

A display 16a is mounted on each of the top portion 21 and display 16b is mounted on the bottom portion 25. When articles are placed on one or both of the scales 15 and 17, the first and second measured weights are communicated to the respective displays 16a and 16b. Displays 16a and 16b are equivalent to the display 16, described above, so descriptions of displays 16a and 16b are not disclosed herein. Each of the displays 16a and 16b may indicate the respective first and second measured weights of the articles that are placed on each of the respective scales 15 and 17. Alternatively, each of the displays 16a and 16b may indicate the sum of the respective second and first measured weights of the articles that are placed on each of the respective scales 17 and 15 of the weight of the respective top portion 21 or bottom portion 25, as the weights of the top portion 21 and bottom portion 25 may be predetermined and preprogrammed into the scales 17 and 15 by the manufacturer or the user. In an alternative embodiment, each of the displays 16a and 16b may simultaneously indicate both the respective second and first measured weights of the articles that are placed on each of the respective scales 17 and 15 and the sum of the respective second and first measured weights of the articles that are placed on each of the respective scales 17 and 15 and the weight of the respective top portion 21 or bottom portion 25. In yet another embodiment of the invention, each of the displays 16a and 16b may simultaneously indicate the respective second and first measured weights of the articles that are place on each of the respective scales 17 and 15, sum of the respective second and first measured weights of the articles placed on each of the respective scales 17 and 15, the weight of the respective top portion 21 or bottom portion 21 and the weight of the respective scales 17 and 15.

In yet another alternative embodiment, the two-portion suitcase 20 may have only one display 16. When articles are placed on one or both of the scales 17 and 15, the second and first measured weights are communicated to the single display 16. The display 16 may indicate each or the sum of the second and first measured weights of the articles that are placed on the scales 17 and 15, respectively. Alternatively, the display 16 may indicate the sum of the second and first measured weights of the articles that are placed on the scales 17 and 15 and of the weight of the two-portion suitcase 20, as the weight of the suitcase 20 may be predetermined and preprogrammed into the scales 17 and 15 by the manufacturer or the user. Alternatively, the display 16 may simultaneously indicate both the second and first measured weights of the articles that are placed on the scales 17 and 15 and the sum of the second and first measured weight of the articles that are placed on the scale 17 and 15 and of the weight of the two-portion suitcase 20. In yet another embodiment, the display 16 may simultaneously indicate both the second and first measured weight of the articles that are placed on the scales 17 and 15, the sum of the second and first measured weights of the articles that are placed on the scale 17 and 15, respectively, the weight of the two-portion suitcase 20 and the weight of the scales 17 and 15. The display 16 may also simultaneously indicate any combination of the first and second measured weights and predetermined weights. The embodiments of FIGS. 1 and 2 are shown as simple suitcases. However, many suitcases may have additional compartments. In these cases, the user may place articles on the scales 15 and 17 to determine the total first and second measured weight before storing the articles into the additional compartments.

Figure 3:
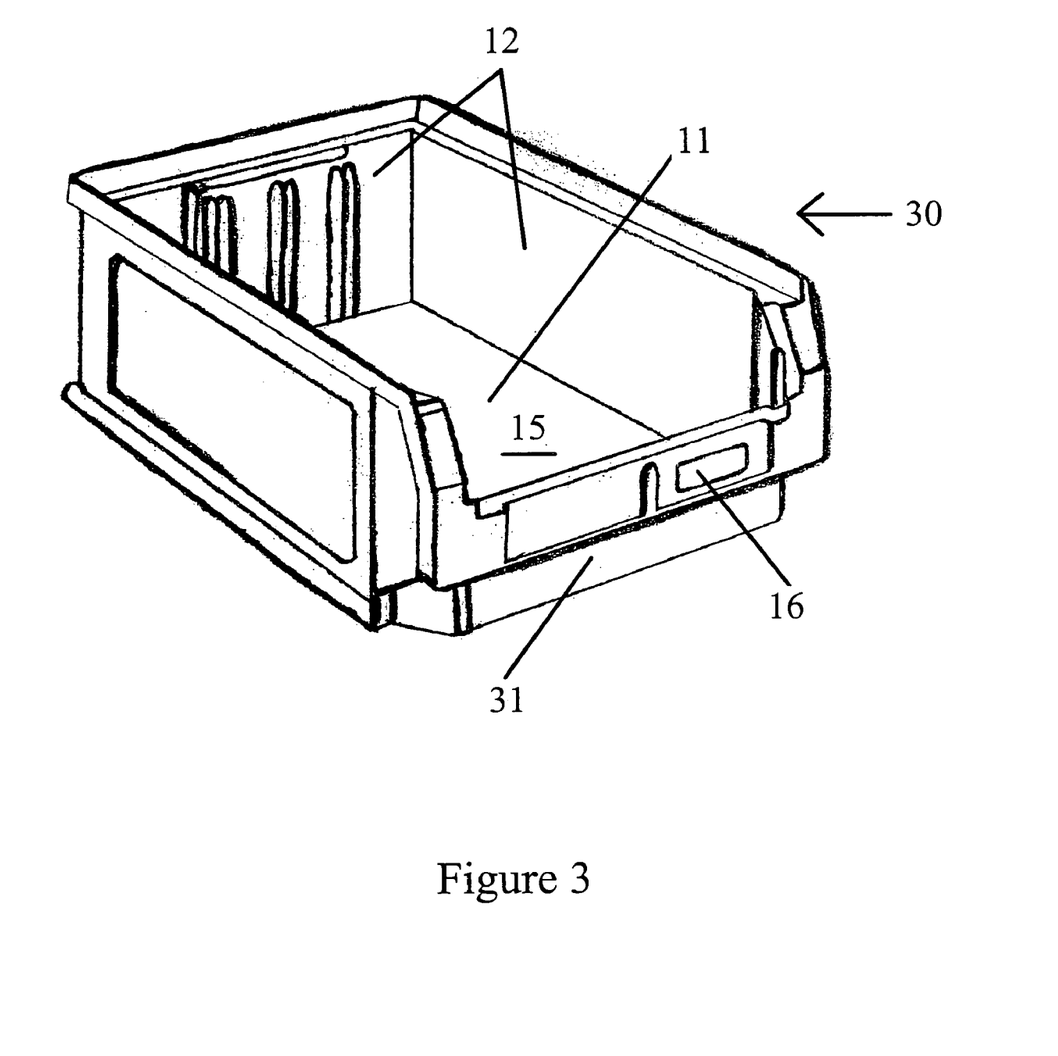
FIG. 3 illustrates another container according to an embodiment of the invention, where the container is a bin.

FIG. 3 shows another embodiment of the present invention, where the container is a stackable bin 30 having a planar bottom 11 attached to a plurality of side walls 12 and a front wall 31, forming an interior compartment. A scale 15 for measuring the weight of a plurality of articles placed atop the scale 15 is mounted on the planar bottom 11. Like most scales known in the art, the scale 15 has a surface for receiving articles to determine the weight of the articles. The surface of the scale 15 covers the entire area of the planar bottom 11. When articles are placed on the scale 15, the measured weight is communicated to the display 16, which is mounted on the stackable bin 30. The display 16 may indicate the measured weight of the articles that are placed on the scale 15. Alternatively, the display 16 may indicate the sum of the measured weight of the articles that are placed on the scale 15 and of the weight of the stackable bin 30, as the weight of the stackable bin 30 may be predetermined and preprogrammed into the scale 15 by the manufacturer or the user. Alternatively, the display 16 may simultaneously indicate both the measured weight of the articles that are placed on the scale 15 and the sum of the measured weight of the articles that are placed on the scale 15 and of the weight of the stackable bin 30. In yet another alternative embodiment, the display 16 may simultaneously indicate both the measured weight of the articles that are placed on the scale 15, the sum of the measured weight of the articles that are placed on the scale 15, the weight of the stackable bin 30 and the weight of the scale 15.

As this embodiment exemplifies, the present invention is not limited to containers with walls (side walls 12 and front wall 31) with equal height. A second stackable bin (not shown) may be stacked atop the stackable bin 30, the opening that would be formed by having the second stackable bin stacked atop of stackable bin 30, allows easy access to and view of the articles in the stackable bin 30 or the removal and/or addition of articles to the stackable bin 30.

Figure 4:
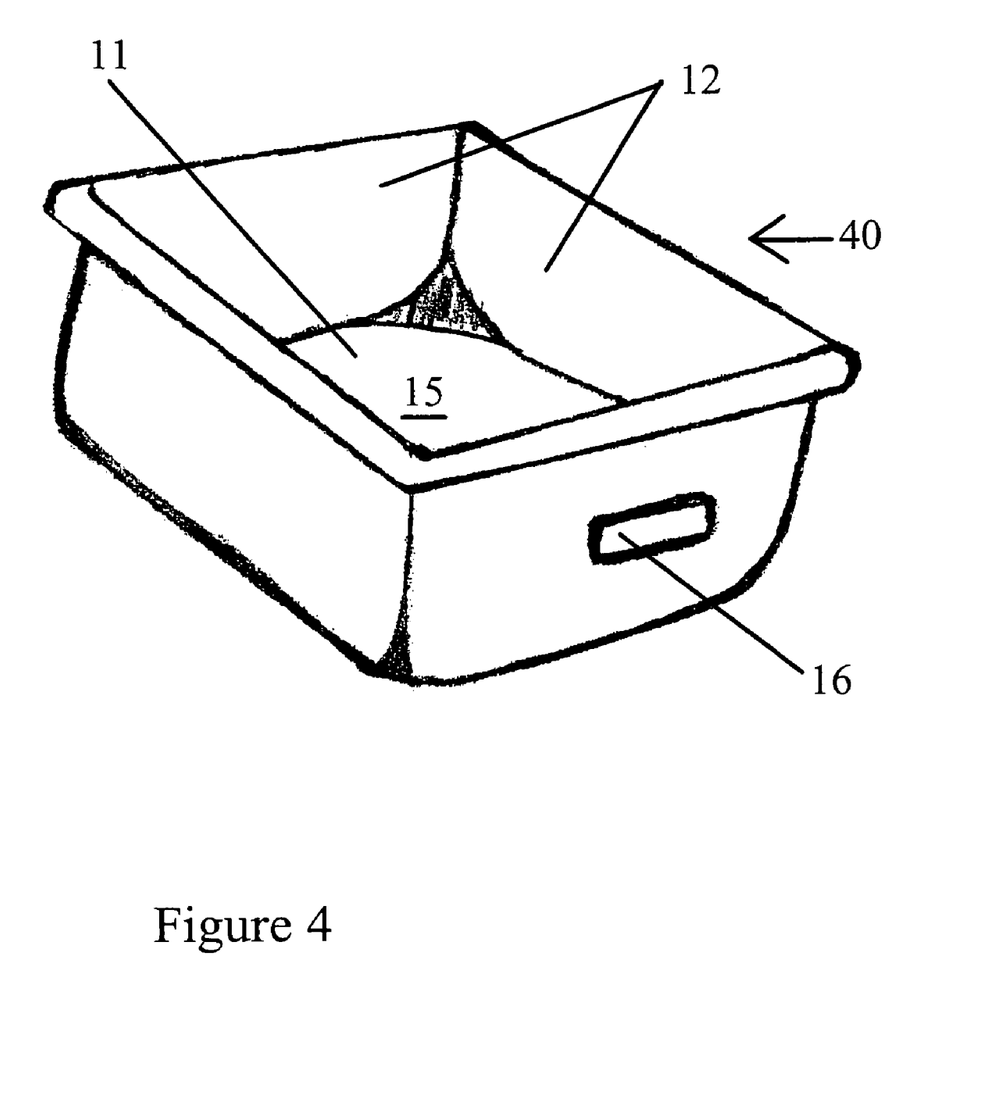
FIG. 4 illustrates yet another container according to an embodiment of the invention, where the container is a tub.

FIG. 4 shows another embodiment of the present invention, wherein the container is a tub 40 having a planar bottom 11 attached to a plurality of side walls 12, forming an interior compartment. Scale 15 for measuring the weight of a plurality of articles placed on top of the scale 15 is mounted on the planar bottom 11. The scale surface of the scale 15 covers the entire area of the planar bottom 11. When articles are placed on the scale 15, the measured weight is communicated to the display 16, which is mounted on the tub 40. The display 16 may indicate the measured weight of the articles that are placed on the scale 15. Alternatively, the display 16 may indicate the sum of the measured weight of the articles that are placed on the scale 15 and of the weight of the tub 40, as the weight of the tub 40 may be predetermined and preprogrammed into the scale 15 by the manufacturer or the user. Alternatively, the display 16 may simultaneously indicate both the measured weight of the articles that are placed on the scale 15 and the weight of the tub 40. In yet another embodiment, the display 16 may simultaneously indicate both the measured weight of the articles that are placed on the scale 15, the weight of the tub 40 and the weight of the scale.

Figure 5:
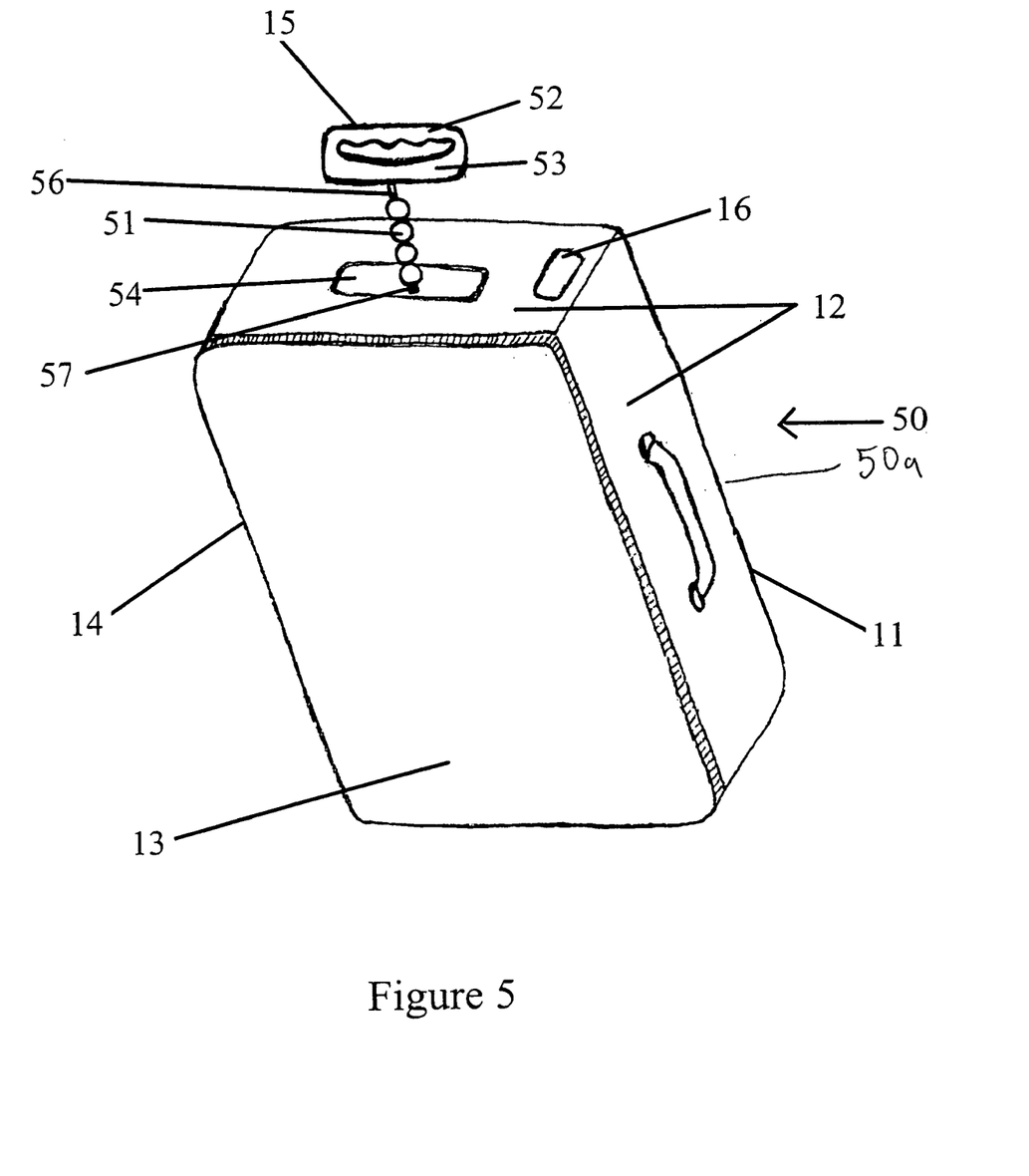
FIG. 5 is another perspective view of a container according to an embodiment of the invention, where the container is a suitcase connected by a flexible connector to a molded handle.

FIG. 5 shows an embodiment of the present invention, wherein the container is a suitcase 50 with a base 50a, which has a planar bottom 11 attached to a plurality of the side walls 12 forming an interior compartment. The suitcase 50 also has a lid that alternates between an open (not shown) position and a closed (shown) position. The lid 13 is fixedly attached to a portion of the plurality of the wall 12 along a common edge 14 by hinges, stitching or any other known in the art. When the suitcase 50 is in the closed position, the lid 13 may be secured to the plurality of side walls 12 by latches, zipper or any other manner known in the art.

One of the plurality of side walls 12 of the base 50a includes a side wall cavity 54. A scale 15 for measuring the weight of the plurality of articles placed on top of the scale 15 is located inside the suitcase 50, which includes a molded handle 52 and support body 53. The scale 15 is fixedly attached to the base 50a or the bottom (not shown) of the side wall cavity 54 by flexible connector 51. The flexible connector 51 has a first end 56 that is fixedly attached to the scale 15 and a second end 57 that is fixedly attached to the bottom of the side wall cavity 54. The flexible connector 51 may be a metal chain or any rigid, yet flexible constructed such as, aluminum, copper, nickel, stainless steel or any metal allow known to those of ordinary skill in the art. The molded handle 52 may be constructed to allow a user to grip the scale and lift the suitcase 50. When a user grips the molded handle 52 and lifts and suspends the suitcase 50, the scale 15 measures the weight of the suitcase 50 and its contents. The measure weight is communicated to the display 16, which is mounted on the suitcase 50.

Preferably, for this embodiment, scale 15 is loaded cell transducer scale. In this type of scale, force (i.e., the weight for the article) in converted to an electrical signal. The load cell transducer scale includes a strain element, a strain gage on the strain element, electronically, and a battery (none of which are shown). Any suitable load cell known to those skilled in the art may be utilized. The strain gage may be provided directly on the support body 53, so that the support body 53 serves as the strain element. Alternately, the scale 15 may include a strain element and a strain gage thereon provided in the cavity of the support body 53. In a condition of no strain (when the suitcase 50 is not suspended), there is a zero output voltage in the load cell circuitry. When the user grips the molded 52 and lifts and suspends the suitcase 50, the surface of the element is strained due to the force exerted by the weight of the suitcase 50 and its contents. This proportional stretching or compressing causes an imbalance in the load cell circuit, which, in turn, produces a proportional output voltage. The output voltage is converted to a weight measurement by conventional electrical and electronic components, and the weight of the suitcase and its contents is displayed in the display 16. Preferably, the measured weight is transmitted wirelessly from the scale 15 to the display 16.

The embodiment of the present invention shown in FIG. 5 may utilized any hanging or crane scale technology known in the art, such as those provided in U.S. Pat. Nos. 6,043,438 and 6,608,261 which are hereby incorporated by reference.

The scale 15 and the flexible connector 51 may be stored within a side wall cavity 54. When stored in the side wall cavity 54, the scale 15 is flush with the side wall 12 of the suitcase 50 and is not protruding from the side wall 12. For the present invention, the scale 15 is designed to measure the weight in any standard units of measurement, such as pounds or kilograms.

In another embodiment, the stackable bin 30, as shown in FIG. 3, one or more displays 16 may be in a remote location, such as on a wall. The display 16 may include the measured weights of the stackable bins 30. This is advantageous because if the display is mounted on the container, then viewing the display of the stackable bins 30 at the higher end of the stack may not be practicable.

The containers may be rigid or non-rigid depending upon the materials and construction for the container. Examples of materials include durable fabrics, metal, wood, plastic or combinations thereof. The side walls can be planar, as shown in FIGS. 1–4, or non-planar. Non-planar containers include, but are not limited to, barrels, drums and duffle bags. The bottom of the container is most preferably rigid and generally planar across the entire area thereof to better accommodate the mounting of a scale.

For the present invention, the display 16 may also simultaneously indicate any combination of the measured and predetermined weights. Furthermore, the scale 15 of the present invention may also include means to display other useful data, including, but on limited to, ambient temperature and time. The date may also be indicated on the display 16.

Although not shown in FIGS. 3 and 4, embodiments of the present invention may also include lids or covers. The lids or covers of the present invention may also include means for securing the lids or covers to the container. Latches, zippers, snap-on molded tops, tops or any other securing mechanisms are utilized to secure the lids to covers.

This invention allows a user to become aware of the weight of the container with its contents before lifting or transporting, therefore increasing safety for the user, as back strain and other physical discomforts can result from the repetitive lifting and prolonged carrying of containers that are too heavy. Furthermore, the claimed invention is a container with a built-in scale that allows a traveler on a commercial airline, train, bus or watercraft, to become aware of the weight of container with its contents so that the traveler can compare the weight of the of the container to baggage weight restrictions prior to departure, therefore, saving the traveler time and money.

It is intended that the foregoing detailed description be regarded as illustrative rather than limiting and that it be understood that it is the following claims, including all equivalents, which are intended to define the scope of the invention.

I claim:

1. A container with a built-in scale comprising:

a bottom portion, wherein the bottom portion comprises a planar bottom base coupled to a plurality of bottom side walls, wherein said planar bottom base and said plurality of bottom side walls form a bottom interior compartment;

a top portion connected to the bottom portion, wherein the top portion comprises a planar top base coupled to a plurality of top side walls, wherein the planar top base and the plurality of top side walls form a top interior compartment;

a bottom scale mounted on said planar bottom base, wherein the bottom scale is configured to determine a first measured weight;

a top scale mounted on said planar top base, wherein the top scale is configured to determine a second measured weight;

wherein the top scale is configured to communicate the determined second measured weight from the top scale to a top portion display mounted on the top portion;

wherein the bottom scale is configured to communicate the determined first measured weight from the bottom scale to a bottom portion display mounted on the bottom portion;

the top portion display is configured to display the determined second measured weight from the top portion; and the bottom portion display is configured to display the determined first measured weight from the bottom portion.

2. The container according to claim 1, wherein the bottom scale and the top scales are digital scales.

3. The container according to claim 1, wherein said container is selected from the group consisting of storage bin, luggage, suitcase, backpack, tote, attaché, tub, briefcase, valise, cooler, chest, box, crate, trunk, locker, drum, barrel and duffle bag.

4. The container according to claim 1, wherein the top scale communicates with the top portion by utilizing a wireless connection.

5. The container according to claim 1, wherein the bottom scale communicates with the bottom portion display by utilizing a wireless connection.

6. The container according to claim 1, wherein the top scale communicates with the top portion display utilizing a hard-wire connection.

7. The container according to claim 1, wherein the bottom scale communicates with the bottom portion display by utilizing a hard-wire connection.

* * * * *